Feb. 17, 1931.                M. R. SHEEN                1,792,772
                          AUTOMOBILE EXCAVATOR
                          Filed June 6, 1928            4 Sheets-Sheet 3
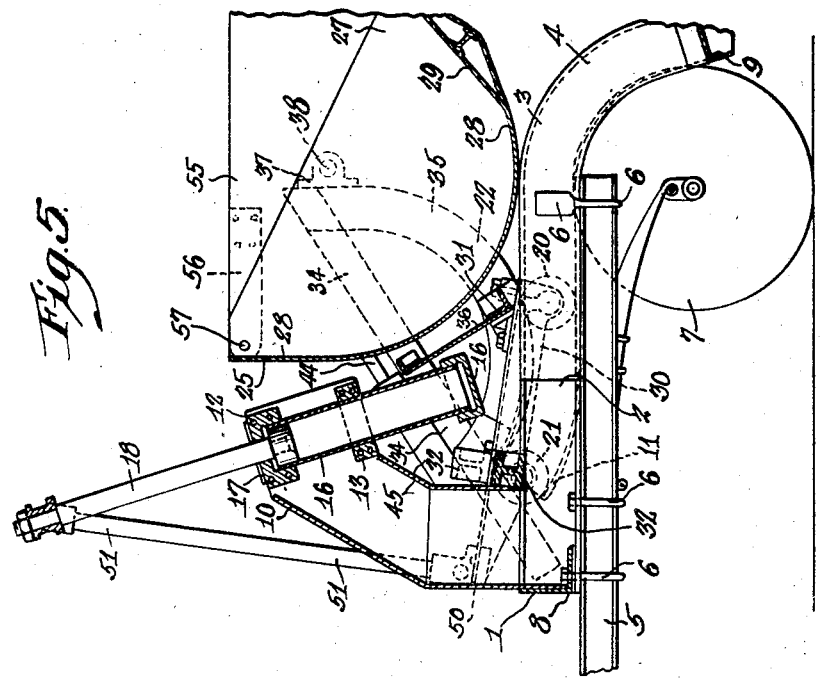
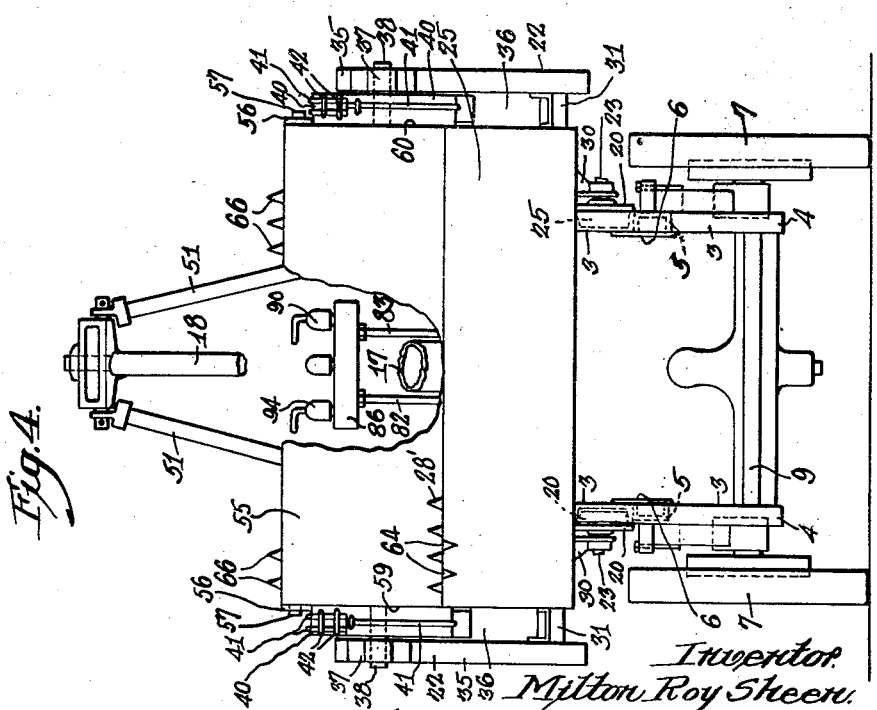
Inventor.
Milton Roy Sheen.
by F. DeWitt Goodwin
Attorney.
Witness:
Walter Ching.

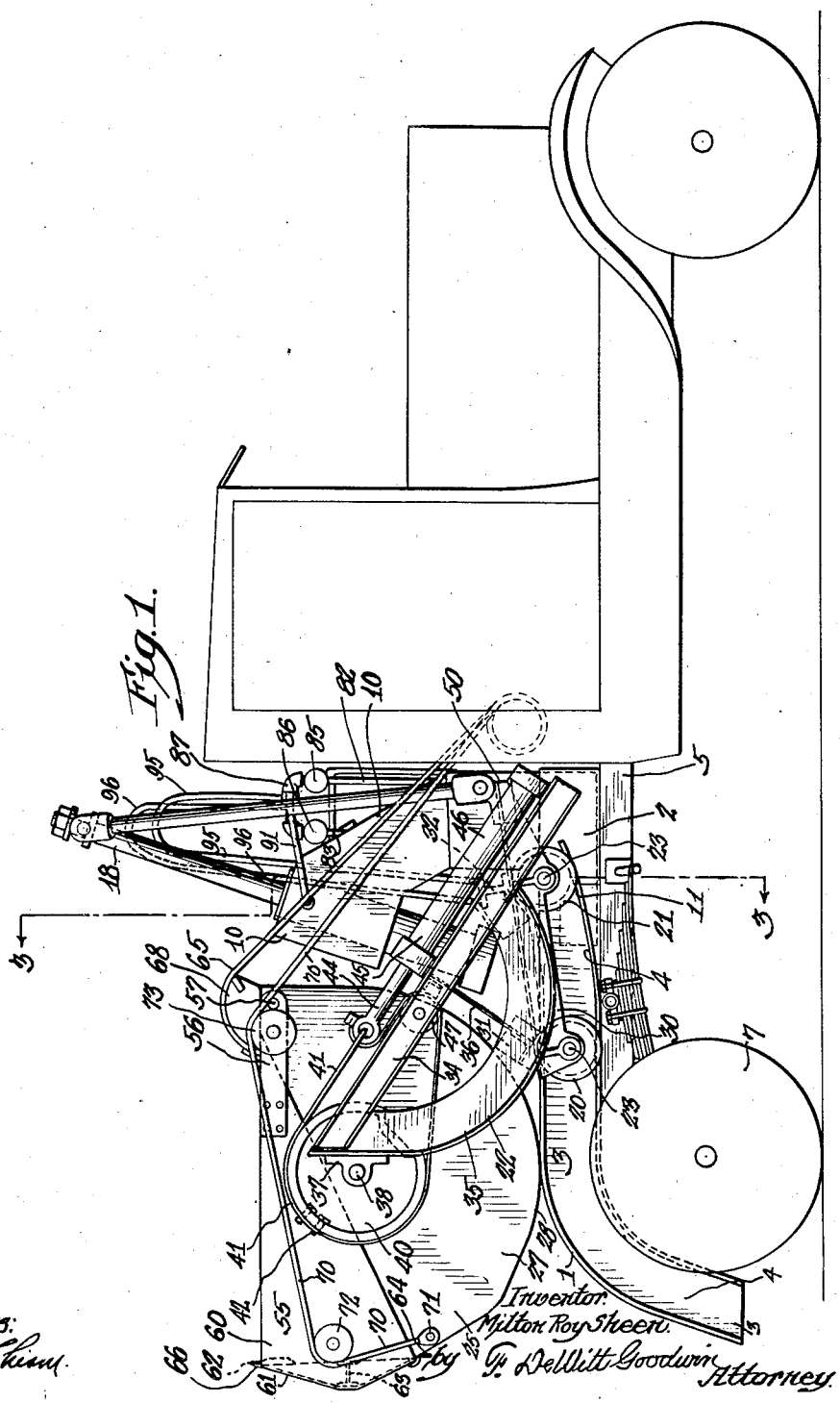

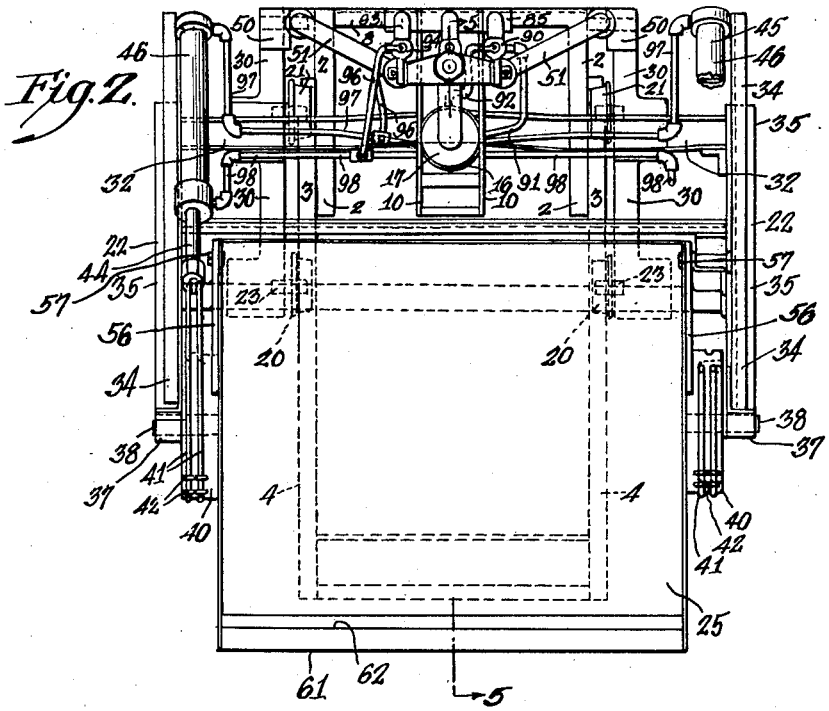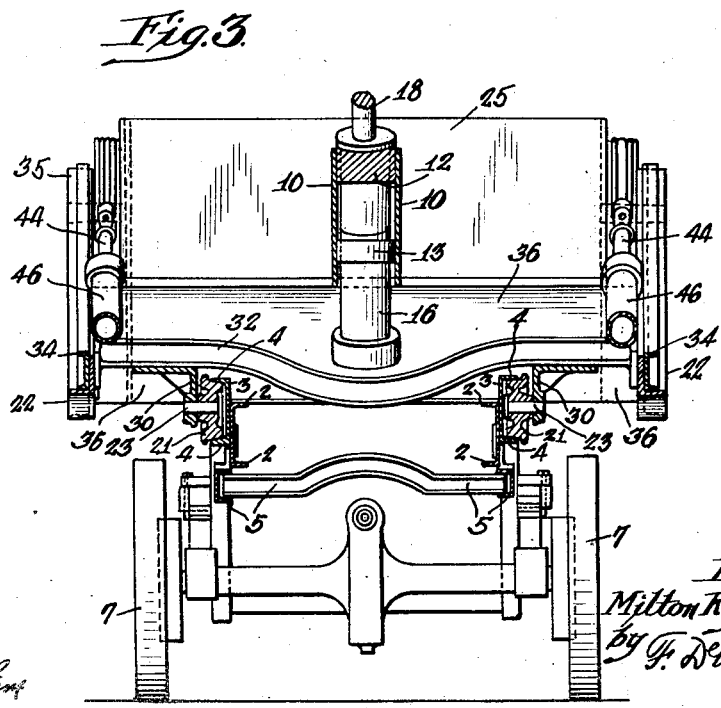

Feb. 17, 1931.  M. R. SHEEN  1,792,772
AUTOMOBILE EXCAVATOR
Filed June 6, 1928  4 Sheets-Sheet 4
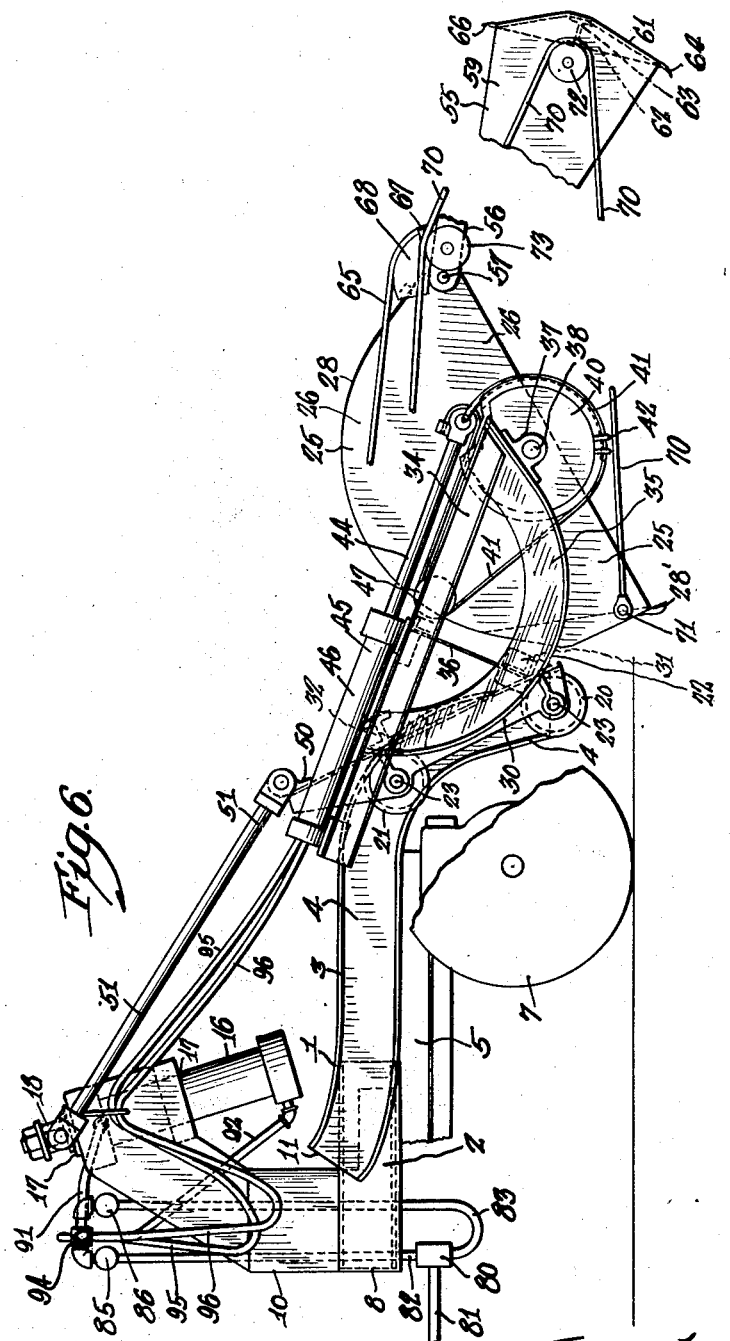
Inventor
Milton Roy Sheen
by F. DeWitt Goodwin
Attorney Patented Feb. 17, 1931

1,792,772

UNITED STATES PATENT OFFICE

MILTON ROY SHEEN, OF PHILADELPHIA, PENNSYLVANIA

AUTOMOBILE EXCAVATOR

Application filed June 6, 1928. Serial No. 283,167.

My invention relates to an excavator adapted to be mounted upon the chassis of an automobile truck or tractor. The object of my invention is to provide an excavator having a bucket-body which forms the body of the truck and is of sufficient size corresponding to the capacity of the chassis, for carrying a truck load of material obtained from excavations made for building purposes, or for building roads and various other purposes; the bucket-body is intended to take the place of the truck body for hauling purposes; a further object of my invention is to provide a suitable frame forming part of the excavator which is detachably secured to the truck chassis, by which the bucket-body may be held and carried in a position upon said frame above the rear wheels of the truck, when in transit, and for lifting the bucket-body from the frame and lowering it to a position in the rear of the truck wheels, whereby the bucket-body may be used as an excavator for digging, or scooping up a load of material which is to be conveyed in said bucket-body; a further object of my invention is to pivotally mount the bucket-body upon the excavator frame, upon an axis extending parallel with the rear wheels of the truck; a further object of my invention is to provide mechanism for rotating the bucket-body upon its axis whereby the bucket-body may be rotated for digging or scooping up material; a still further object is to provide a hinge jaw upon the bucket-body which is movable by suitable mechanism, to and from the bucket-body for the purpose of digging or scooping upon material and to assist in filling the bocket-body; and a still further object of my invention is to provide various novel features of construction and operations of the parts for carrying out my invention to form in excavator which is simple in operation, and which can be manufactured at a low cost.

Referring to the accompanying drawings Fig. 1 is a side elevation of my novel excavating device mounted upon an automobile truck. Fig. 2 is a plan view of the excavator shown detached from the truck. Fig. 3 is a transverse vertical section on line 3—3 Fig. 1. Fig. 4 is a rear elevation of Fig. 1. Fig. 5 is a central vertical section of the excavator, as on line 5—5 Fig. 2, shown mounted upon the chassis of the truck, and Fig. 6 is a side elevation of the rear portion of the truck showing the excavator and bucket-body in the operative position with the movable jaw in the open position.

The excavator frame 1 comprises side members each formed of a channel iron 2, rigidly secured to a channel iron 3, forming tracks 4. Said side members art adapted to rest upon the automobile chassis 5, to which the frame 1 is detachably secured by suitable fastening devices 6. The frame member channel irons 2 and 3 are located on the opposite sides of the frame 1 and are rigidly secured together by transverse members 8 and 9. A pedestal 10 also forms part of the rigid frame 1, and is supported upon the cross member 8 and the channel irons 2 of the frame 1. The pedestal 10 forms bearings 12 and 13 for the cylinder 16 of the hydraulic jack 17, which is located upon the longitudinal center line of the frame 1 and in an elevated position upon said frame.

The channel irons 3 forming the tracks 4 extend rearwardly above the wheels 7 of the truck, and said channel irons 3 are curved downwardly toward the base line upon which the wheels 7 rest and the outwardly turned flanges of the channel irons 3 form the tracks 4 for the rollers 20 and 21 forming part of a carriage 22, upon which the bucket-body 25 is mounted.

The inner ends of the tracks 4 have upwardly turned portions 11 as shown in Fig. 1, which are adapted to elevate the rollers 21, relatively to the rollers 20, so that the carriage 22 will tilt sufficiently to allow the bucket-body 25 to rest upon the tracks 4 when the bucket-body is elevated to the position shown in Fig. 1, thus allowing the weight of the bucket-body to be carried upon the tracks 4, when being transported.

The carriage 22 consists of the cheek pieces 30 forming bearings for the shafts 23 carrying the rollers 20 and 21, as shown in Figs. 1 and 3. The cheek pieces 30 upon opposite sides of the frame 1 are rigidly connected by transverse members 31 and 32. Said member 32 is curved downwardly throughout the central portion of the frame so that it will pass freely below the lower end of the cylinder 16 when the carriage is in the elevated position, as shown in Figs. 1, 3 and 5. Upon the outer ends of the cross members 31 and 32 are rigidly secured side bearing frame members 34 and 35 secured together and also rigidly secured to a transverse plate 36, having its lower edge rigidly secured to the cross member 31, carried by the cheek pieces 30. Said bearing members 35 are provided with bearings 37 for the shafts 38 secured to the opposite ends of the bucket-body 25, thus pivotally mounting the bucket-body, in said bearings 37, upon the carriage 22.

The bucket-body 25 is rotated upon the carriage 22 by means of drums 40 rigidly secured to the shafts 38. Said drums 40 on opposite ends of the bucket-body, have secured thereto flexible cables 41, by means of clamps 42. One end of each cable 41 is secured to a plunger 44 which is slidably mounted in a cylinder 45 forming a hydraulic jack 46.

The opposite end of said cable 41 passes around a pulley 47 which is loosely mounted on the bearing member 34 and said cable 41 is again secured to said plunger 44, whereby a movement of the plunger 44 will operate the cable, which in turn will rotate the drum 40 and the bucket-body 25.

The cheek pieces 30 of the carriage extend rearwardly of the rollers 21 and are provided with bearings 50, upon which are pivotally secured the links 51 having their upper ends pivotally attached to the plunger 18 of the jack 17. When it is desired to lower the bucket-body 25 from the position shown in Fig. 1, to the position shown in Fig. 6, the jack 17 is operated to lower the plunger 18, which movement of the latter forces the links 51 downwardly applying a force to the extension portion of the carriage 22 to which the links 51 are attached thus the roller 21 of the carriage acts as a fulcrum, whereby the force applied through the links 51 tends to lift the weight of the bucket-body 25 from the rollers 20 causing the rollers 21 to roll down the curve portion 11 of the tracks 4. The bucket-body 25 will be thus lifted free of the tracks 4, so that the carriage may be readily moved by the jack 17 and forced along the tracks 4 to the downwardly curved portion of the latter extending beyond the rear of the wheels 7 of the truck, and the carriage 22 will assume the position shown in Fig. 6, in which the bucket-body is supported upon the carriage beyond the rear portion of the truck, in which position the bucket-body may be rotated by the jacks 46, for forcing the cutting edge of the bucket-body into the ground for excavating purposes.

By rotating the bucket-body upon its axis 38, the bucket-body may be operated for scooping up material for filling the bucket-body, which rotating operations may be repeated if necessary for completely filling the bucket-body. The rotating feature of the bucket-body also facilitates in turning it to a position for dumping the material from the bucket.

The bucket-body 25 consists of end portions 26 and 27 carried by the shafts 38 and an arcuate body portion 28 secured to the end portions. The portion 28 is reinforced adjacent to the cutting edge by an inner plate 29, supported by a transverse rib. Said cutting edge is provided with teeth 28′ adapting the bucket-body for digging purposes as well as for scooping up loose material. By means of the jacks 46 and the drums 40, the bucket-body may be rotated upon its axis 38, when in the position shown in Fig. 6 so that the cutting edge and teeth 28′ may be forced into the material which is to be loosened or excavated.

The bucket-body 25 is provided with a movable jaw 55 which is pivoted upon the bucket-body by straps 56 secured upon the jaw 55 and pivoted upon shafts 57, secured upon the end walls of the body. The movable jaw 55 consists of the two end walls 59 and 60 and a transverse wall 61 which latter is reinforced by an inner plate 62, and supported by a transverse rib 63, and the lower edge of the transverse wall is provided with teeth 64 which register with the teeth 28′, on the bucket-body 25, so that the movable jaw 55 may be used for digging in connection with the bucket-body and the teeth 28′ on the latter.

The movable jaw 55 may be used for digging upon a horizontal surface, as shown in Fig. 6 and by further opening the jaw 55 it may also be used for digging into a vertical surface, and it is provided with teeth 66 for this purpose. The movable jaw normally rests upon the top edges of the bucket-body 25, as shown in Fig. 1 and thus enlarges the capacity of the bucket-body.

The movable jaw 55 is provided with means for opening and closing the same relatively to the bucket-body 25, consisting of a cable 65 which is secured by a fastening device 67 to the periphery of an arcuate member 68, which is secured upon the strap 56, forming part of the jaw 55. The opposite end of the cable 65 is provided with suitable means for pulling the cable whereby the jaw 55 may be rotated upon the pivot shaft 57, thus opening the jaw relatively to the bucket-body 25. A cable 70 is provided for closing the jaw 55 toward the bucket-body 25. Said cable 70 is attached to the bucket-body 25 by a securing device 71 and the cable passes around a pulley 72, freely pivoted upon the jaw 55, and also passes around another pulley 73 freely pivoted upon the strap 56 of the jaw 55. The opposite end of the cable 70 is provided with suitable means not shown in the drawings for pulling the cable, whereby the movable jaw 55 will be moved about the pivot shaft 57 and drawn toward the close position upon the bucket-body 25, shown in Fig. 1. The jaw 55 may be lifted by the cable 65 into the open position shown in Fig. 6, and used for digging purposes by tightening the cable 70, which will draw the cutting edge of the jaw 55 carrying the teeth 64 toward the cutting edge of the bucket-body 25, carrying the teeth 28, thus facilitating in digging and also in filling the bucket-body with a full load of material.

The jacks 17 and 46 are supplied with hydraulic pressure from a pump 80 shown in Fig. 6. Said pump is rotated by a shaft 81, through suitable mechanism operated by the motive power of the automobile truck. The pump 80 is connected by pipes 82 and 83 for conveying the pressure to and from the manifolds 85 and 86. The pipe connections 87 between the manifolds are provided with a valve 90 for controlling the pressure through pipes 91 and 92 connected with opposite ends of the cylinder 16 of the jack 17 for operating the plunger 18, by which the carriage 22 may be moved throughout the length of the tracks 4, for raising and lowering the bucket-body.

The pipe connections 93 between the manifolds 85 and 86 are provided with a valve 94 which is connected through flexible pipes 95 and 96 with transverse pipes 97 and 98 connected with the corresponding ends of the jacks 46, located upon opposite sides of the carriage 22, by which the jacks 46 may be operated for rotating the bucket-body upon the carriage 22. The operating means for applying a pulling force to the cable 65 and 70 may be of any standard type, such as a mechanical winch, not shown in the drawings.

The jacks 46 for rotating the bucket-body upon the axis 38, for digging purposes as above described, may also be operated when the body is full of material for dumping the bucket-body by operating the jacks 46 to rotate the bucket-body into the position shown in Fig. 6. The dumping of the bucket-body may take place when the carriage 22 has been moved to an intermediate position beteween that shown in Fig. 1, and the position shown in Fig. 6.

By tightening the cables 65 and 70 the jaw 55 may be held rigidly upon the bucket-body 25 so that the upper edge of the jaw 55 may be used as a scraper by moving the automobile truck backward, and adjusting the carriage 22 so that the jaw 55 will be at the proper level for operating the same as a scraper.

By operating the jack 17 the links 51 will lift the carriage, which latter is guided by the rollers 20 and 21, moving in the tracks 4. When the carriage is being lifted by the jack 17 the jacks 46 may be operated so as to rotate the bucket-body into a suitable position for retaining the material within the bucket-body. When the carriage has been drawn to a position above the truck wheels 7, shown in Fig. 1, the curve portion 11 of the track 4 will tilt the carriage 22 and allow the bucket-body to rest upon the top surface of the tracks 30, shown in Fig. 1.

With my novel arrangement of the excavator the cutting edge of the bucket-body may be forced downwardly into the ground by means of the jack 17, with great force due to the jack acting against the weight of the truck, therefore, the force which may be exerted upon the bucket-body will only be limited by the weight of the truck. By means of the jack 17 the carriage and the bearings in which the bucket-body is pivoted may be rigidly held in a position, such as shown in Fig. 6, and when power is applied to the cable 70 the jaw 55 will be drawn into the ground due to the weight of the truck holding the bearings, in which the bucket-body is pivoted, in a fixed position.

What is claimed is:—

1. The combination of an automobile truck chassis, a bucket-body forming the body of the truck for conveying materials, a supporting member movably mounted upon the chassis, said body rotatably mounted upon said supporting member, said supporting member adapted to be supported in a carrying position with the bucket-body located above said chassis, means upon the chassis for moving the supporting member to and from the carrying position above the chassis to an operative position beyond and below the end of the chassis, a drum secured upon said bucket-body concentric with the axis thereof, a cable for rotating the drum, and power operated means for operating the cable for rotating the bucket-body.

2. The combination of an automobile truck chassis, a bucket-body forming the body of the truck for coveying materials, a supporting member movably mounted upon the chassis, upon which the bucket-body is rotatably mounted, said supporting member adapted to be supported in a carrying position, with the bucket-body located above said chassis, power operated means upon the chassis for moving the supporting member to and from a carrying position above the chassis to an operative position beyond and below the end of the chassis for forcing the bucket-body into the ground beyond the end of the chassis for excavating purposes, and means operatively associated between said supporting member and the bucket-body for rotating the bucket-body upon said supporting member.

3. The combination of an automobile truck chassis, a bucket-body forming the body of the truck for conveying materials, a supporting member movably mounted upon the chassis, bearings upon opposite sides of said supporting member, said bucket-body having a cylindrical body portion axially rotatable in said bearings, said body portion having a cutting edge extending parallel with the axis thereof, means operatively mounted upon the chassis for moving the supporting member to and from a carrying position above the chassis to an operative position beyond and below the end of the chassis, and means upon the supporting member for rotating the bucket-body upon its axis for forcing said cutting edge into the material to be excavated.

4. The combination of an automobile truck chassis, a bucket-body forming the body of the truck for conveying materials, a supporting member movably mounted upon the chassis upon which the bucket-body is rotatably mounted, said supporting member adapted to be supported in a carrying position with the bucket-body located above said chassis, a hydraulic jack mounted upon the chassis and operatively associated with said supporting member for moving the latter to and from a carrying position above the chassis to an operative position beyond and below the end of the chassis for forcing the bucket-body into the ground beyond the end of the chassis for excavating purposes, and means operatively associated between said supporting member and the bucket-body for rotating the bucket-body upon said supporting member.

5. The combination of an automobile truck chassis, a bucket-body forming the body of the truck for conveying materials, a supporting member movably mounted upon the chassis upon which the bucket-body is rotatably mounted, said supporting member adapted to be supported in a carrying position with the bucket-body located above said chassis, a hydraulic jack mounted upon the chassis and operatively associated with said supporting member for moving the latter to and from a carrying position above the chassis to an operative position beyond and below the end of the chassis, means upon the chassis for supplying said jack with motive power, and a valve associated with said jack for controlling the movements of the latter.

6. The combination of an automobile truck chassis, a bucket-body forming the body of the truck for conveying materials, a supporting member movably mounted upon the chassis upon which the bucket-body is rotatably mounted, said supporting member adapted to be supported in a carrying position with the bucket-body located above said chassis, a hydraulic jack mounted upon the chassis and operatively associated with said supporting member for moving the latter to and from a carrying position above the chassis to an operative position beyond and below the end of the chassis, a hydraulic jack mounted upon said supporting member for rotating the bucket-body, means upon the chassis for supplying said jacks with motive power, and valves associated with said jacks for independently controlling the movements of the same.

7. The combination of an automobile truck chassis, a bucket-body forming the body of the truck for conveying materials, tracks mounted upon opposite sides of the chassis extending beyond the end of the latter, a carriage mounted upon said tracks, bearings upon the carriage in which the bucket-body is rotatably mounted, means upon the carriage for rotating the bucket-body in said bearings, and means upon the chassis for moving the carriage upon said tracks from a carrying position above the chassis to an operative position beyond the end of the chassis.

8. The combination of an automobile truck chassis, a bucket-body forming the body of the truck for conveying materials, tracks mounted upon opposite sides of the chassis having curved portions extending outwardly and downwardly beyond the end of the chassis, a carriage mounted upon said tracks, bearings upon the carriage in which the bucket-body is rotatably mounted, means upon the carriage for rotating the bucket-body in said bearings, and means upon the chassis for moving the carriage upon said tracks from a carrying position above the chassis to an operative position adjacent to the curved portion of said tracks.

9. The combination of an automobile truck chassis, a bucket-body forming the body of the truck for conveying materials, tracks mounted upon opposite sides of the chassis, said tracks having end portions extending beyond the end of the chassis, said tracks having upwardly curved portions upon the opposite ends thereof located above the chassis, a carriage mounted upon said tracks, bearing upon the carriage in which the bucket-body is rotatably mounted, means upon the chassis for moving the carriage into said upwardly curved portions of the tracks for tilting the carriage to allow the bucket-body to rest upon the tracks in a carrying position above the chassis and for moving the carriage upon the tracks to a position beyond the chassis, and means operatively associated with the bucket-body for rotating the same upon the carriage.

10. The combination of an automobile truck chassis, a supporting member movably mounted upon the chassis, a bucket-body mounted upon said supporting member, a jaw pivotally associated with the bucket-body, a cable operatively associated with the bucket-body having one end attached to said jaw for opening the jaw relatively to the bucket-body, and a cable operatively associated with said jaw having one end attached to the bucket-body for closing the jaw upon the bucket-body.

11. The combination of an automobile truck chassis, a supporting member movably mounted upon the chassis, a bucket-body mounted upon said supporting member, a jaw pivotally associated with the bucket-body, means operatively associated with the bucket-body for rotating the same upon the supporting member, a cable attached to the bucket-body, and a pulley upon the outer portion of the jaw relatively to the pivot point of the latter around which the cable passes for closing the jaw relatively to the bucket-body.

12. The combination of an automobile truck chassis, a bucket-body forming the body of the truck for conveying materials, a supporting member movably mounted upon the chassis, said body rotatably mounted upon said supporting member, said supporting member adapted to be supported in a carrying position with the bucket-body located above said chassis, means upon the chassis for moving the supporting member to and from the carrying position above the chassis to an operative position beyond and below the end of the chassis, means upon the supporting member for rotating the bucket-body, a movable jaw pivotally mounted upon the bucket-body, and means associated with the bucket-body for opening and closing the jaw relatively to the bucket-body.

13. The combination of an automobile truck chassis, a bucket-body forming the body of the truck for conveying materials, tracks mounted upon opposite sides of the chassis, said tracks having end portions extending beyond the end of the chassis, a carriage having rollers mounted upon said tracks, cheek pieces upon said carriage extending beyond said rollers, a jack mounted upon the chassis, links pivotally connected between the jack and said cheek pieces extending beyond the rollers of the carriage for moving the latter, bearings upon opposite sides of said carriage, said bucket-body rotatably mounted in said bearings, means upon the carriage for rotating the bucket-body in said bearings, a jaw pivotally mounted upon the bucket-body, and means operatively associated with said jaw and the bucket-body for opening and closing the jaw relatively to said bucket-body.

In testimony whereof I affix my signature.

MILTON ROY SHEEN.